United States Patent [19]
Takahara et al.

[11] Patent Number: 5,977,903
[45] Date of Patent: Nov. 2, 1999

[54] SCANNING MECHANISM FOR VEHICLE-MOUNTED RADAR

[75] Inventors: Toshiyuki Takahara; Masahiro Watanabe, both of Tokyo, Japan

[73] Assignee: Mitsubishi Denki Kabushiki Kaisha, Tokyo, Japan

[21] Appl. No.: 09/015,918

[22] Filed: Jan. 30, 1998

[30] Foreign Application Priority Data

Jul. 15, 1997 [JP] Japan ................................... 9-189515

[51] Int. Cl.$^6$ ................................................. G01S 13/93
[52] U.S. Cl. ............................................................. 342/70
[58] Field of Search ............................ 342/70; 180/169, 180/178

[56] References Cited

U.S. PATENT DOCUMENTS 3,590,313  6/1971  Stoke ........................................ 74/390

Primary Examiner—Ian J. Lobo
Attorney, Agent, or Firm—Sughrue, Mion, Zinn, Macpeak & Seas, PLLC

[57] ABSTRACT

A scanning mechanism for vehicle-mounted radar comprises a first noncircular gear attached to an input shaft, a second noncircular gear meshed with the first noncircular gear, and a connecting link having one end connected to an eccentric pin provided on the second noncircular gear and another end connected to an antenna transmission/reception section, thereby allowing the antenna transmission/reception section to effect swinging motion. Angular accuracy in a frontal direction is improved by delaying the scanning velocity in the frontal direction.

2 Claims, 6 Drawing Sheets

SCANNING MECHANISM FOR VEHICLE-MOUNTED RADAR

BACKGROUND OF THE INVENTION

The present invention relates to a scanning mechanism for a vehicle-mounted radar apparatus.

As a conventional vehicle-mounted radar apparatus, an apparatus such as the one shown in FIG. 6 is known.

In the drawing, an antenna transmission/reception section 31 is comprised of an antenna unit 32, a coupler 33, a voltage controlled oscillator 34, a frequency conversion unit 35, and a gain control unit 36. Further, a signal processing section 37 is comprised of a modulated-signal control unit 38, a frequency analysis unit 39, and an arithmetic-operation control unit 40. Reference numeral 41 denotes a mechanical driving section.

In the vehicle-mounted radar apparatus configured as described above, the modulated-signal control unit 38 supplies a modulation signal to the voltage controlled oscillator 34 to allow the voltage controlled oscillator 34 to generate relatively high frequency radio waves subjected to linear frequency modulation. The relatively high frequency radio waves subjected to linear frequency modulation and outputted from the voltage controlled oscillator 34 are radiated to space from the antenna unit 32 via the coupler 33. Meanwhile, received radio waves from an object which reflects transmitted radio waves are received by the antenna unit 32 and are supplied to the frequency conversion unit 35.

In the frequency conversion unit 35, part of the transmitted radio waves from the coupler 33 and the received radio waves from the antenna unit 32 are mixed, and a relatively low frequency signal is generated. An amount of transition of a frequency based on the time lag of radio waves corresponding to the distance to the object and an amount of transition of a Doppler frequency based on the moving velocity in a case where the object is moving are added to the frequency of the received radio waves. Accordingly, information such as the relative distance to the object and the relative velocity are multiplexed with the relatively low frequency signal generated by the frequency conversion unit 35. The power of this multiplexed signal is set by the gain control unit 36 in such a manner as to assume an appropriate magnitude for each scanning of the transmitted radio waves and the transmitted radio waves by the mechanical driving section 41, and the arithmetic-operation control unit 40 computes the relative distance, the relative velocity, and the like with respect to the frequency data from the frequency analysis unit 39.

Next, a description will be given of the above-described mechanical driving section 41.

As a device for effecting scanning to receive radio waves reflected from an object located in an arbitrary direction, a device which uses a quadric link mechanism such as the one shown in FIG. 7 is known.

In the drawing, the antenna transmission/reception section 31 is rotatably supported by a swinging shaft 42. A connecting pin 43 is formed integrally with the transmission/reception section 31, and one end of a connecting link 44 is connected to the connecting pin 43 via a bearing, while the other end of the connecting link 44 is similarly connected rotatably to an eccentric pin 45 via a bearing. A disk 47 is attached to a rotating shaft 46.

Next, a description will be given of a scanning mechanism.

As the rotating shaft 46 is rotated at an equal velocity by, for example, a motor (not shown) and an appropriate speed-reducing mechanism (not shown), the eccentric pin 45 undergoes rotary motion on a circle r indicated by the dotted-dash line in FIG. 7. Since one end of the connecting link 44 is rotatably connected to the eccentric pin 45 via the bearing, and the other end thereof is similarly connected via the bearing to the connecting pin 43 provided on the antenna transmission/reception section 31, the antenna transmission/reception section 31 undergoes swinging motion about the swinging shaft 42. That is, a quadric link mechanism having as its nodal points the swinging shaft 42, the connecting pin 43, the eccentric pin 45, and the rotating shaft 46 is mechanically formed, whereby the rotary motion of the rotating shaft 46 is converted to the swinging motion of the connecting pin 43. Since the connecting pin 43 is formed integrally with the antenna transmission/reception section 31, the antenna transmission/reception section 31 undergoes swinging motion about the swinging shaft 42 so as to continuously change the direction of transmission and reception of radio waves, thereby effecting scanning.

At this time, the change over time of a swinging angle θ of the antenna transmission/reception section 31 assumes a substantially sinusoidal function, as shown in FIG. 8.

Since the conventional vehicle-mounted radar apparatus is configured as described above, the scanning velocity is high in the vicinity of the frontal direction for which particularly detailed angular information is required, as shown in FIG. 8. Therefore, the angle measuring accuracy becomes relatively low, so that there has been a problem in that the amount of information obtainable for the frontal direction becomes small.

In addition, although it is conceivable to overcome the above-described problem by adopting a cam mechanism as the scanning mechanism so as to obtain equal velocity scanning, in the case of an electromagnetic radar, the mass of the antenna transmission/reception section for effecting scanning is liable to become large. Hence, there is a drawback in that a problem occurs, such as the occurrence of a jump at the cam surface and a decline in the durability.

SUMMARY OF THE INVENTION

The present invention has been devised to overcome the above-described problems, and its object is to provide a vehicle-mounted radar apparatus which is capable of improving the angular accuracy in the frontal direction by delaying the scanning velocity in the frontal direction and capable of decreasing the number of speed-reducing gears in the case of, for instance, a gear-type speed-reducing mechanism by simplifying the speed-reducing mechanism.

The scanning mechanism for a vehicle-mounted radar apparatus in accordance with the present invention comprises: a first noncircular gear attached to an input shaft; a second noncircular gear meshing with the first noncircular gear; and a connecting link having one end connected to an eccentric pin provided on the second noncircular gear and another end connected to an antenna transmission/reception section.

In the scanning mechanism for a vehicle-mounted radar apparatus in accordance with the present invention, the first noncircular gear is eccentrically attached to the input shaft, and a circumference of the first noncircular gear is set to be smaller than a circumference of the second noncircular gear.

DETAILED DESCRIPTION OF THE PREFERRED EMBODIMENTS

First Embodiment

Figure 1:
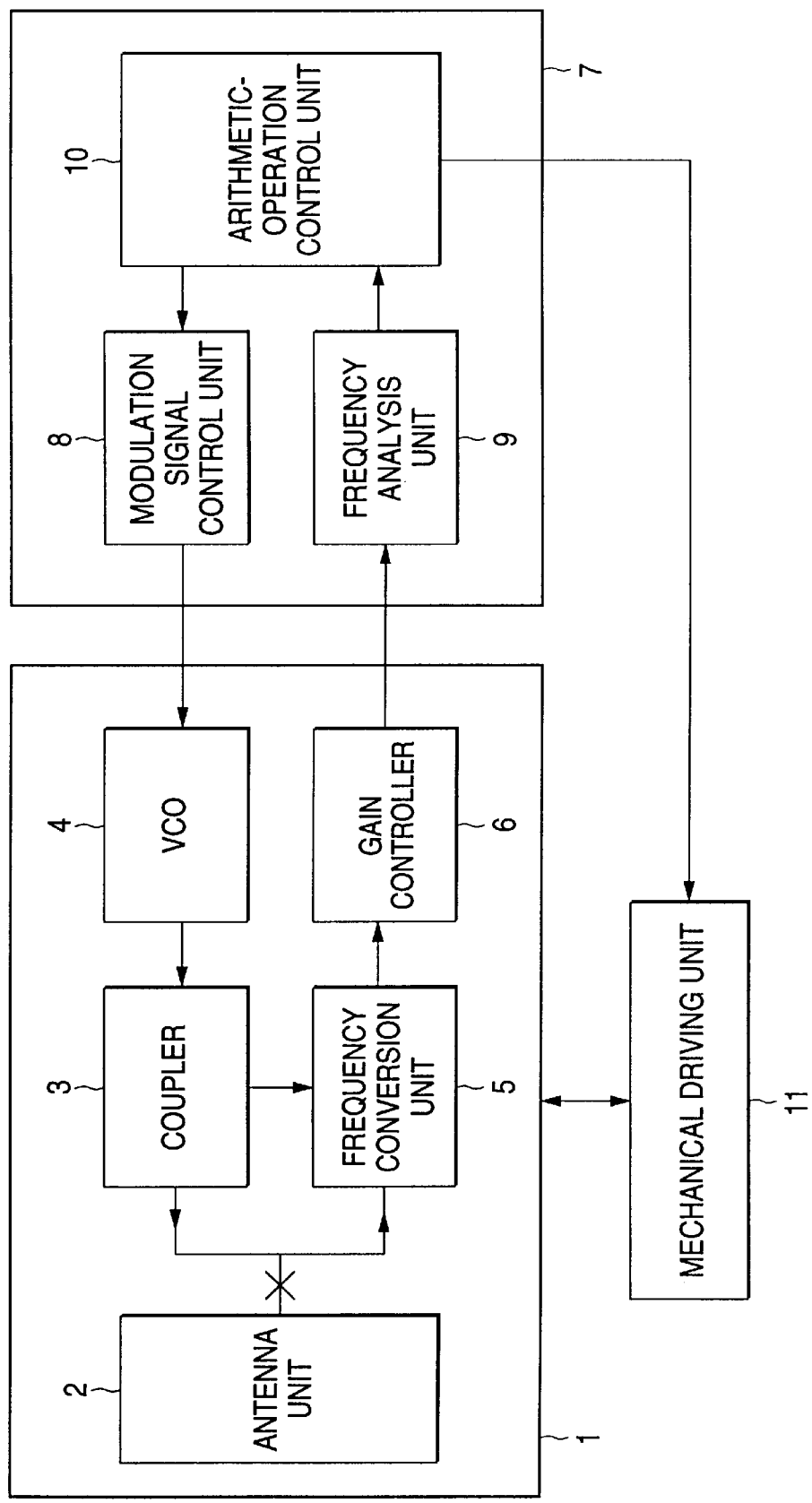
FIG. 1 is a schematic diagram illustrating a vehicle-mounted radar apparatus in accordance with a first embodiment of the present invention.

Referring now to the drawings, a description will be given of an embodiment of the present invention.

FIG. 1 is a schematic diagram illustrating a vehicle-mounted radar apparatus in accordance with an embodiment of the present invention. In the drawing, an antenna transmission/reception section 1 is comprised of an antenna unit 2, a coupler 3, a voltage controlled oscillator 4, a frequency conversion unit 5, and a gain control unit 6. Further, a signal processing section 7 is comprised of a modulated-signal control unit 8, a frequency analysis unit 9, and an arithmetic-operation control unit 10. Reference numeral 11 denotes a mechanical driving section.

In the vehicle-mounted radar apparatus configured as described above, the modulated-signal control unit 8 supplies a modulation signal to the voltage controlled oscillator 4 to allow the voltage controlled oscillator 4 to generate relatively high frequency radio waves subjected to linear frequency modulation. The relatively high frequency radio waves subjected to linear frequency modulation and outputted from the voltage controlled oscillator 4 are radiated to space from the antenna unit 2 via the coupler 3. Meanwhile, received radio waves from an object which reflects transmitted radio waves are received by the antenna unit 2 and are supplied to the frequency conversion unit 5.

In the frequency conversion unit 5, part of the transmitted radio waves from the coupler 3 and the received radio waves from the antenna unit 2 are mixed, and a relatively low frequency signal is generated. An amount of transition of a frequency based on the time lag of radio waves corresponding to the distance to the object and an amount of transition of a Doppler frequency based on the moving velocity in a case where the object is moving are added to the frequency of the received radio waves. Accordingly, information such as the relative distance to the object and the relative velocity are multiplexed with the relatively low frequency signal generated by the frequency conversion unit 5. The power of this multiplexed signal is set by the gain control unit 6 in such a manner as to assume an appropriate magnitude for each scanning of the transmitted radio waves and the transmitted radio waves by the mechanical driving section 11, and the arithmetic-operation control unit 10 computes the relative distance, the relative velocity, and the like with respect to the frequency data from the frequency analysis unit 9.

Next, a description will be given of the above-described mechanical driving section 11.

Figure 2:
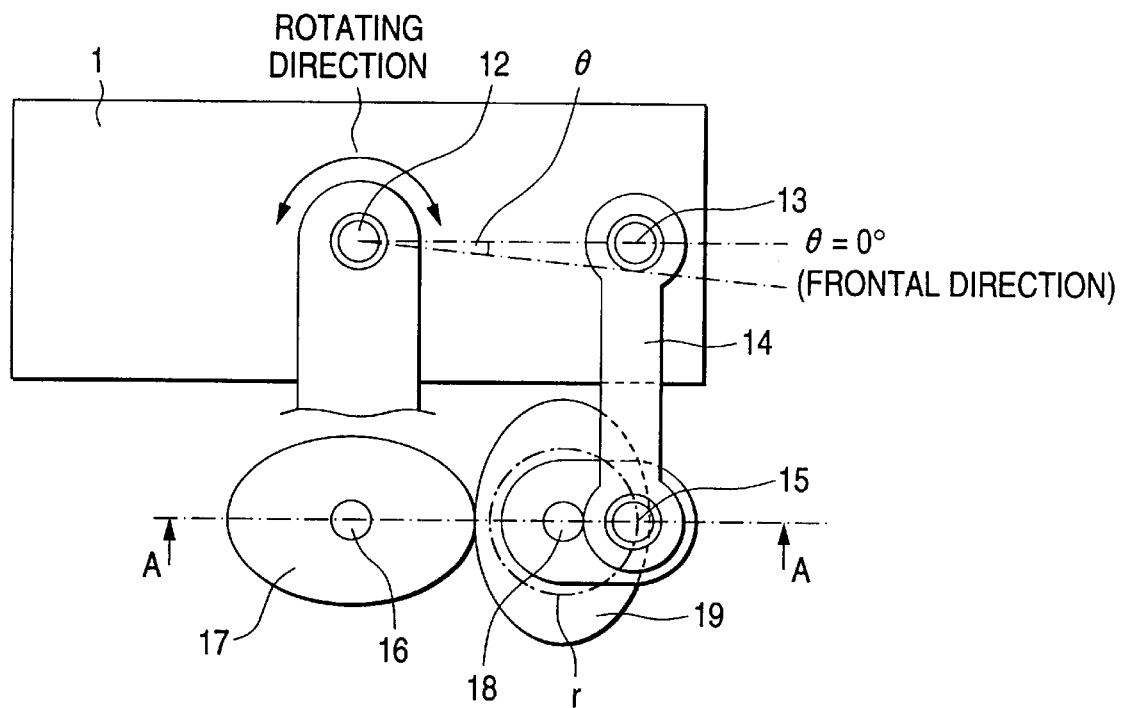
FIG. 2 is a plan view illustrating a scanning mechanism for a vehicle-mounted radar apparatus in accordance with the first embodiment of the present invention.
Figure 3:
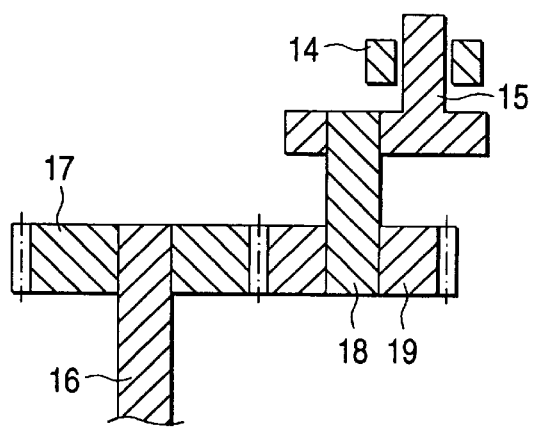
FIG. 3 is a cross-sectional view taken along line A—A of FIG. 2.

FIG. 2 is a plan view illustrating a scanning mechanism which is the mechanical driving section. FIG. 3 is a cross-sectional view taken along line A—A of FIG. 2.

In the drawing, the antenna transmission/reception section 1 is rotatably supported by a swinging shaft 12. A connecting pin 13 is formed integrally with the transmission/reception section 1, and one end of a connecting link 14 is connected to the connecting pin 13 via a bearing, while the other end of the connecting link 14 is similarly connected rotatably to an eccentric pin 15 via a bearing.

A first noncircular gear 17 is attached to an input shaft 16, and a second noncircular gear 19 which meshes with the first noncircular gear 17 is attached to a rotating shaft 18 formed integrally with the eccentric pin 15.

Next, a description will be given of the scanning mechanism.

The input shaft 16 is rotated at an equal velocity by, for example, a motor (not shown) and an appropriate speed-reducing mechanism (not shown). The equal-velocity rotary motion of the input shaft 16 is converted to unequal-velocity rotary motion by the rotating-velocity converting action of the first noncircular gear 17 and the second noncircular gear 19, and is transmitted to the rotating shaft 18. The eccentric pin 15 formed integrally with the rotating shaft 18 undergoes rotary motion on a circle r indicated by the dotted-dash line in FIG. 1, but its rotating velocity changes periodically due to the conversion to unequal-velocity rotary motion. Meanwhile, since one end of the connecting link 14 is rotatably connected to the eccentric pin 15 via the bearing, and the other end thereof is similarly connected via the bearing to the connecting pin 13 provided on the antenna transmission/reception section 1, the antenna transmission/reception section 1 undergoes swinging motion about the swinging shaft 12 so as to continuously change the direction of transmission and reception of radio waves, thereby effecting scanning.

Figure 4:
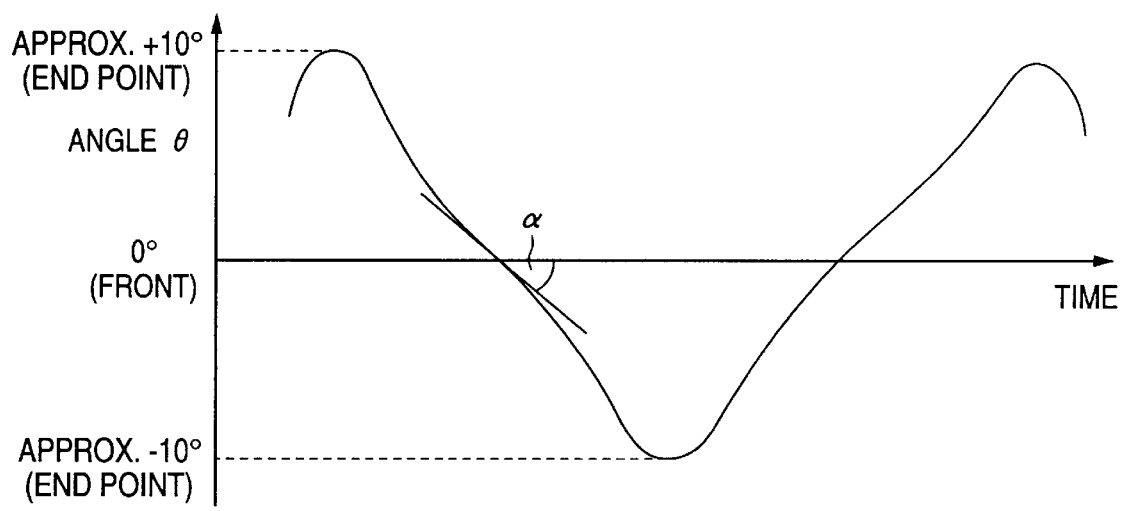
FIG. 4 is a graph illustrating a change over time of a swinging angle of an antenna transmission/reception section in accordance with the first embodiment of the present invention.

At this time, the swinging angle θ of the antenna transmission/reception section 1 changes as shown in FIG. 4.

Figure 8:
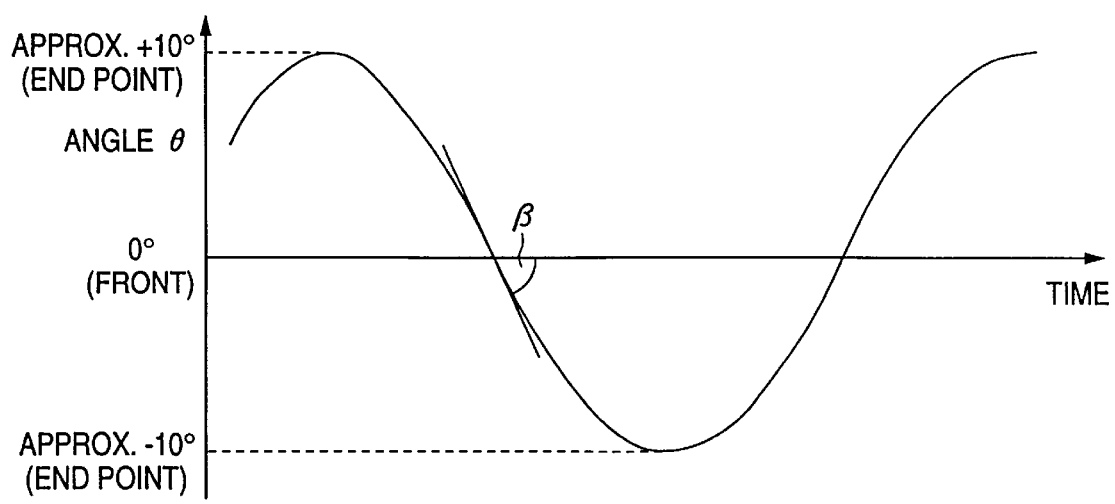
FIG. 8 is a graph illustrating a change over time of the swinging angle of a conventional antenna transmission/reception section.

As for the change in the swinging angle of this antenna transmission/reception section 1, the velocity in the frontal direction is delayed as compared with the case of the conventional example shown in FIG. 8, and it is possible to improve the angular accuracy in the frontal direction. That is, if the angle of a tangential line in the frontal direction in FIG. 4 is set as a, and the angle of a tangential line in the frontal direction in FIG. 8 is set as b, then a<b.

Thus, by virtue of the rotary-velocity converting function of the first and second noncircular gears 17 and 19, the rotating velocity of the rotating elements of the quadric link mechanism becomes slow when the antenna transmission/reception section 1 is in the vicinity of the frontal direction, whereas the rotating velocity of the rotating elements of the quadric link mechanism becomes fast when the antenna transmission/reception section 1 is in the vicinity of a nodal point, thereby making it possible to improve the angular accuracy in the frontal direction.

Second Embodiment

Figure 5:
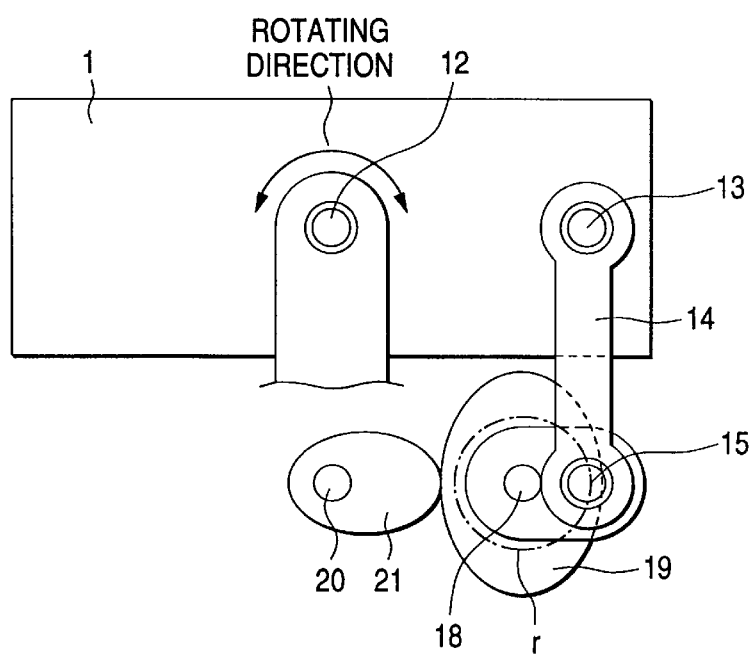
FIG. 5 is a plan view illustrating the scanning mechanism for a vehicle-mounted radar apparatus in accordance with a second embodiment of the present invention.
Figure 6:
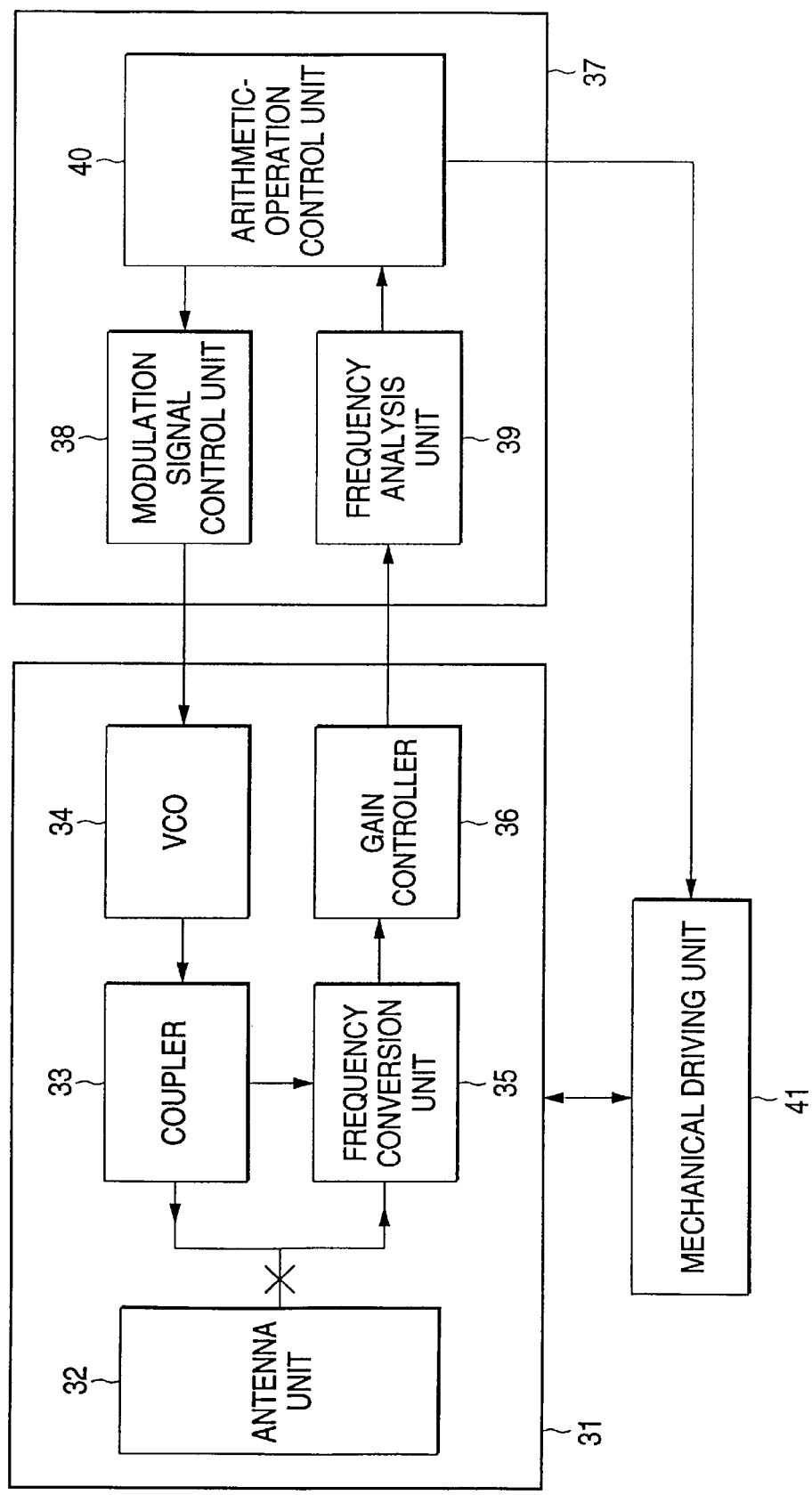
FIG. 6 is a schematic diagram illustrating a conventional vehicle-mounted radar apparatus.
Figure 7:
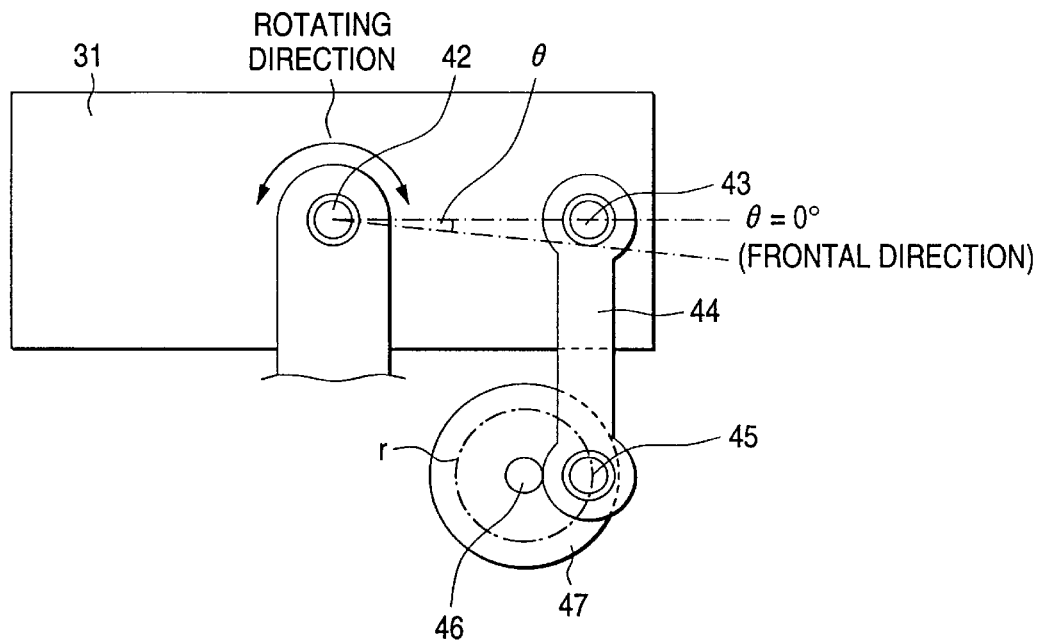
FIG. 7 is a plan view illustrating a scanning mechanism for the vehicle-mounted radar apparatus.

FIG. 5 is a plan view illustrating the scanning mechanism, i.e., the mechanical driving section, in accordance with a second embodiment of the present invention.

In the drawing, the antenna transmission/reception section 1 is rotatably supported by the swinging shaft 12. The connecting pin 13 is formed integrally with the antenna transmission/reception section 1, and one end of the connecting link 14 is connected to the connecting pin 13 via the bearing, while the other end of the connecting link 14 is similarly connected rotatably to the eccentric pin 15 via the bearing. A first noncircular gear 21 is attached to an input shaft 20, and the second noncircular gear 19 which meshes with the first noncircular gear 21 is attached to the rotating shaft 18 formed integrally with the eccentric pin 15.

Here, the size of the first noncircular gear 21 is made smaller than the size of the second noncircular gear 19 as compared with the case of the first embodiment, and the input shaft 20 is made eccentric, thereby forming the speed-reducing mechanism.

Next, a description will be given of the operation of the scanning mechanism.

The input shaft 20 is rotated at an equal velocity by, for example, a motor (not shown) and an appropriate speed-reducing mechanism (not shown). By means of the rotating-velocity converting action of the first noncircular gear 21 and the second noncircular gear 19, the equal-velocity rotary motion of the input shaft 20 is converted to unequal-velocity rotary motion, concurrently undergoes a reduction in velocity, and is transmitted to the rotating shaft 18.

It should be noted that, in the embodiment shown in FIG. 5, since the circumference of the second noncircular gear 19 is set to be twice the circumference of the first noncircular gear 21, a basic reduction gear ratio is set to 2.

The eccentric pin 15 formed integrally with the rotating shaft 18 undergoes rotary motion on a circle r indicated by the dotted-dash line in FIG. 5, but its rotating velocity changes periodically as shown in FIG. 4 due to the conversion to unequal-velocity rotary motion. Meanwhile, since one end of the connecting link 14 is rotatably connected to the eccentric pin 15 via the bearing, and the other end thereof is similarly connected via the bearing to the connecting pin 13 provided on the antenna transmission/reception section 1, the antenna transmission/reception section 1 undergoes swinging motion about the swinging shaft 12 so as to continuously change the direction of transmission and reception of radio waves, thereby effecting scanning.

As described above, by using a noncircular gear having a speed-reducing function, it becomes possible to simplify the speed-reducing mechanism in a first stage. In the case of, for instance, a gear-type speed-reducing mechanism, it is possible to decrease the number of speed-reducing gears.

Figure 9A:
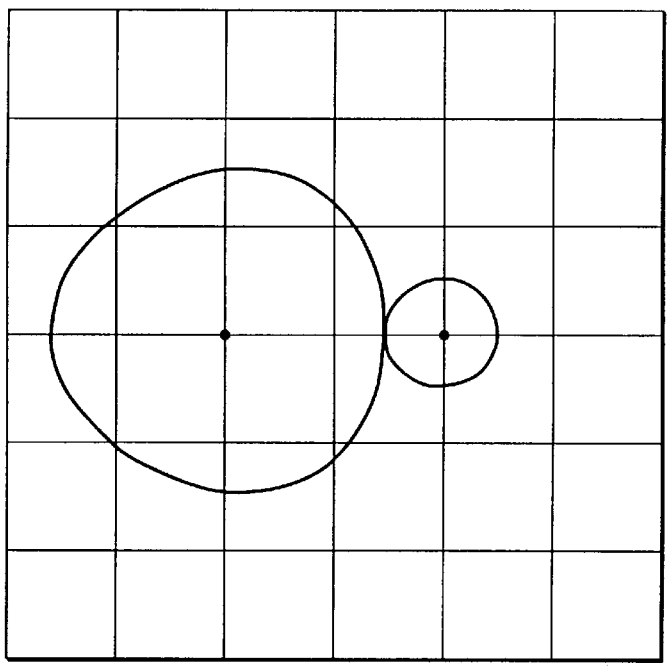
FIG. 9A illustrates a case where the circumferential ratio is 3:1 and the basic reduction gear ratio is 3.
Figure 9B:
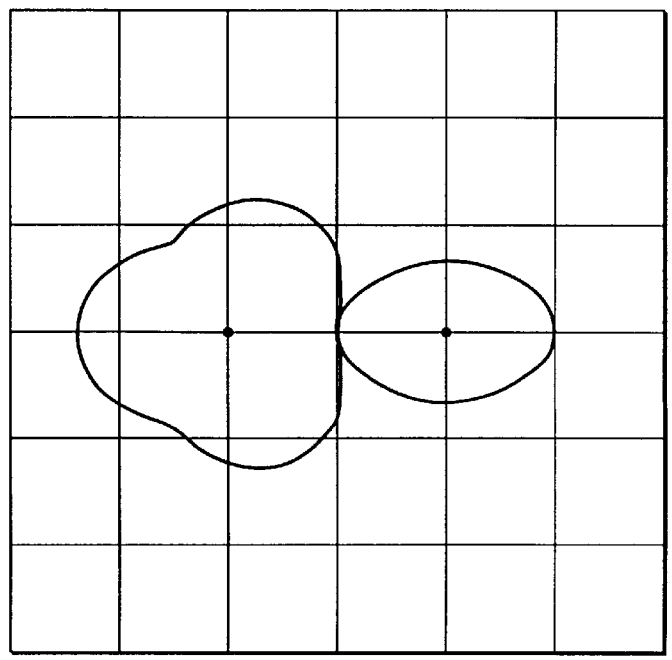
FIG. 9B illustrates a case where the circumferential ratio is 3:2 and the basic reduction gear ratio is 1.5.

It should be noted that although, in the above, a description has been given of the case where the ratio of the circumference of the first noncircular gear 21 to that of the second noncircular gear 19 is set to be 2:1, and the basic reduction gear ratio is set to 2, the circumferential ratio and the basic reduction gear ratio may be set to other values insofar as they satisfy the conditions under which meshable and rotatable noncircular gears can be formed. For instance, even in a case where the circumferential ratio is 3:1 and the basic reduction gear ratio is 3 (FIG. 9A), or a case where the circumferential ratio is 3:2 and the basic reduction gear ratio is 1.5 (FIG. 9B), the object of the present invention can be attained.

In accordance with the scanning mechanism for a vehicle-mounted radar apparatus according to the present invention, the scanning mechanism comprises a first noncircular gear attached to an input shaft; a second noncircular gear meshing with the first noncircular gear; and a connecting link having one end connected to an eccentric pin provided on the second noncircular gear and another end connected to an antenna transmission/reception section. Accordingly, it is possible to delay the scanning velocity in the frontal direction, and improve the angular accuracy in the frontal direction.

In accordance with the scanning mechanism for a vehicle-mounted radar apparatus according to the present invention, the first noncircular gear is eccentrically attached to the input shaft, and a circumference of the first noncircular gear is set to be smaller than a circumference of the second noncircular gear. Therefore, it is possible to simplify the speed-reducing mechanism in a first stage, and decrease the number of speed-reducing gears in the case of, for instance, a gear-type speed-reducing mechanism.

What is claimed is:

1. A scanning mechanism for a vehicle-mounted radar apparatus, comprising:

antenna transmission/reception section which is rotatably supported by a shaft;

a first noncircular gear attached to an input shaft;

a second noncircular gear meshing with said first noncircular gear; and a connecting link having one end connected to an eccentric pin provided on said second noncircular gear and another end connected to said antenna transmission/reception section, said noncircular gears being operable to vary a rotational velocity of said antenna transmission/reception section so as to improve a measuring accuracy in a vicinity of said radar's frontal direction.

2. A scanning mechanism for a vehicle-mounted radar apparatus according to claim 1, wherein said first noncircular gear is eccentrically attached to said input shaft, and a circumference of said first noncircular gear is set to be smaller than a circumference of said second noncircular gear.

\* \* \* \* \*